United States Patent
Sorrini et al.

(10) Patent No.: US 7,660,311 B2
(45) Date of Patent: Feb. 9, 2010

(54) METHOD AND SYSTEM FOR ENABLING CONNECTION OF A CALL

(75) Inventors: Piero Sorrini, Ottawa (CA); Gatot Susilo, Kanata (CA)

(73) Assignee: Alcatel Lucent, Paris (FR)

( * ) Notice: Subject to any disclaimer, the term of this patent is extended or adjusted under 35 U.S.C. 154(b) by 497 days.

(21) Appl. No.: 11/324,612

(22) Filed: Jan. 3, 2006

(65) Prior Publication Data

US 2007/0153800 A1  Jul. 5, 2007

(51) Int. Cl.
H04L 12/28 (2006.01)
(52) U.S. Cl. .................................... 370/395.2
(58) Field of Classification Search ............. 370/395.2, 370/395.3, 399
See application file for complete search history.

(56) References Cited

U.S. PATENT DOCUMENTS

| | | | |
|---|---|---|---|
| 5,703,880 A * | 12/1997 | Miura | 370/465 |
| 6,185,288 B1 * | 2/2001 | Wong | 379/219 |
| 6,574,224 B1 * | 6/2003 | Brueckheimer et al. | 370/395.6 |
| 6,714,544 B1 * | 3/2004 | Bosloy et al. | 370/395.1 |
| 7,020,150 B2 * | 3/2006 | Ho et al. | 370/412 |
| 2005/0169279 A1 * | 8/2005 | Magd et al. | 370/395.5 |
| 2006/0233167 A1 * | 10/2006 | McAllister et al. | 370/389 |

OTHER PUBLICATIONS

The ATM Forum Technical Committee, "ATM-MPLS Network Interworking Signaling Specification Version 1.0" af-cs-0197.000, Aug. 2003.
MFA Forum, "ATM and Frame Relay to MPLS Control Plane Interworking: Client-Server. Final Ballot Text," MFA Forum, XP-002446509, pp. 1-17, Dec. 2005.
Bocci, M., et al., "Enhancing Converged MPLS Data Networks with ATM, Frame Relay and Ethernet Interworking," Alcatel Communications Review, XP-007010176, pp. 1-9, Oct. 2004.
"ATM-MPLS network interworking-Frame mode user plane interworking," ITU-T Standard in Force (I), International Telecommunication Union, XP-017404368, pp. 1-24, Nov. 2003.
ATM Forum Technical Committee, "ATM-MLPS Network Interworking Signalling Specification Version 1.0," XP-002446510, pp. 1-53, Aug. 2003.

* cited by examiner

Primary Examiner—Derrick W Ferris
Assistant Examiner—Mohammad Anwar
(74) Attorney, Agent, or Firm—Kramer & Amado, PC

(57) ABSTRACT

Methods and a system for connecting a call across a network of network elements as a path for the call is being set up are provided. The call comprises a parameter for which a value must be assigned for each segment of the path between adjacent network elements. At least one network element supports multiple values for the parameter. A network element on the communication path receives an indicator that indicates that network elements along the path of the call are required to use a predetermined value for the parameter. A connection is established to an adjacent network element on the path using the predetermined value for the parameter, prior to setting up a next segment of the path.

17 Claims, 3 Drawing Sheets

METHOD AND SYSTEM FOR ENABLING CONNECTION OF A CALL

FIELD OF THE INVENTION

The present invention relates to connecting a call, across network elements in a network, at the time the path for the call is being set up. In particular, the present invention relates to, but is not limited to supporting susceptibility to clipping at call setup in interworked ATM-MPLS (Asynchronous Transfer Mode-Multiple Protocol Labelling System) Networks.

BACKGROUND

In ATM (Asynchronous Transfer Mode) networks, it is possible to connect a voice call across a node element as the path for the call is routed to the destination. This is known as susceptibility to clipping or cut-through. Susceptibility to clipping eliminates any delay that would otherwise be incurred by waiting for the called party to answer before establishing the path of the call. When susceptibility to clipping is enabled for a call in an ATM network, a setup message for the call is sent from a preceding node to an adjacent succeeding node on a call path. A VPI/VCI (Virtual Path Identifier/Virtual Circuit Identifier) is negotiated between the two nodes and then a call proceed message is sent from the succeeding node to the preceding node and the necessary cross-connects are established on the preceding nodes. This procedure is repeated until the destination is reached.

In an interworked ATM-MPLS network, PNNI signalling is carried between multi-service interworking network elements (INEs) located where each ATM network meets an MPLS. The signalling is used to set up calls across the interworked network. When a call setup procedure reaches the edge of an MPLS network, three parameters must be negotiated between the INE and a node at the edge of the MPLS network: VPI/VCI; interworking label; and encapsulation mode. The encapsulation mode is the method used to insert data into a different kind of packet so that the original packet is hidden. The first two parameters are negotiated and determined as the call setup progresses from node to node in the MPLS. The encapsulation mode, on the other hand, is not determined until the destination answers the call and a connect message is sent back to the source. Therefore, susceptibility to clipping, which requires that the path be fully established before the call is answered at the destination, is not supported in MPLS.

The procedure for negotiating encapsulation mode is for each preceding node to send a list of candidate encapsulation modes to a subsequent adjacent node. Some nodes are more efficient at certain encapsulation modes than others. A mutually efficient option is chosen between adjacent nodes as the call setup progresses. The choice of the succeeding node is not provided to the preceding side until the confirmation message is received from the destination node. Once the destination node is reached, a CONNECT message is returned along the path. When the CONNECT message is received at a node, the node determines if it can support a cross-connect with the encapsulation mode negotiated with the subsequent adjacent node and the encapsulation mode negotiated with the preceding adjacent node. If it can, the cross-connect is made using the negotiated encapsulation modes. If not, a cross-connect is made using a 1:1 cell mode. The support of 1:1 cell mode is mandatory by all nodes in an MPLS network, however, that support is not guaranteed.

ATM-MPLS network interworking is becoming a preferred solution for seamless migration from ATM to MPLS networks. However, voice service subscribers have grown accustomed to receiving superior quality service over ATM networks with little or no delay in obtaining a speech path upon answering a call.

The ATM-MPLS Network Interworking Signalling Specification (af-cs-0197.000), herein incorporated by reference in its entirety, does not specify how to provide cut-through or susceptibility to clipping functionality.

SUMMARY OF THE INVENTION

According to one aspect of the present invention, there is provided a method for connecting a call across a network of network elements as a path for the call is being set up, the call comprising a parameter for which a value must be assigned for each segment of the path between adjacent network elements, at least one network element supporting multiple values for the parameter, the method comprising: receiving at a network element on the communication path an indicator that indicates that network elements along the path of the call are required to use a predetermined value for the parameter; and establishing a connection to an adjacent network element on the path using the predetermined value for the parameter, prior to setting up a next segment of the path.

According to a second aspect of the present invention, there is provided a method for connecting a call across a network of network elements as a path for the call is being set up, the call comprising a parameter for which a value must be assigned for each segment of the path between adjacent network elements, at least one network element supporting multiple values for the parameter, the method comprising: determining that a particular value for the parameter is to be used for the call; and sending an indicator to a network element on the path, the indicator indicating that the particular value is to be used, the network element configured to use the particular value for the parameter in response receiving the indicator and to connect to an adjacent network element on the path, prior to setting up a next segment of the path.

According to a third aspect of the present invention, there is provided a system for enabling connection of a call across a network of network elements as a path for the call is being set up, the call comprising a parameter for which a value must be assigned for each segment of the path between adjacent network elements, at least one network element supporting multiple values for the parameter, the system comprising: a module for creating a setup message for the call, the setup message containing a indicator that a particular value for the parameter is to be used; and an interface for sending the setup message to a network element on the path, the network element configured to use the particular value for the parameter in response to detecting the indicator and to connect to an adjacent network element, prior to setting up a next segment of the path.

According to a fourth aspect of the present invention, there is provided a network element configured to implement any of the methods described herein.

According to a fifth aspect of the present invention, there is provided a computer readable medium having computer readable instructions stored thereon that when executed implement any of the methods described herein.

Embodiments of the present invention enable susceptibility to clipping in a MPLS network by setting a predetermined encapsulation mode for a call before the call is setup. When the nodes on the path of the call receive an indicator with the setup message that the particular encapsulation mode is to be used, the connections are made using that encapsulation mode as the call is routed.

Other aspects and features of the present invention will become apparent, to those ordinarily skilled in the art, upon review of the following description of the specific embodiments of the invention.

BRIEF DESCRIPTION OF THE DRAWINGS

Examples of embodiments of the invention will now be described in greater detail with reference to the accompanying drawings, in which.

DETAILED DESCRIPTION OF THE PREFERRED EMBODIMENTS

Embodiments of the present invention provide a system and methods for connecting a call across a network, as the path for the call is being setup. A value for a parameter of the call is predetermined. An indicator to use that value is sent to the network elements as the call is routed. Using embodiments of the present invention enables susceptibility to clipping in interworked ATM-MPLS networks by enforcing the use of a particular value for the encapsulation mode. When embodiments of the present invention are used in interworked ATM-MPLS networks, the indicator indicates a value to use for the encapsulation mode, thereby enabling the nodes to make the necessary cross-connects as the call is routed. Thus there will be reduced delay in obtaining a call path after the call is answered. Embodiments of the present invention are useful in providing voice services over interworked networks.

Figure 1:
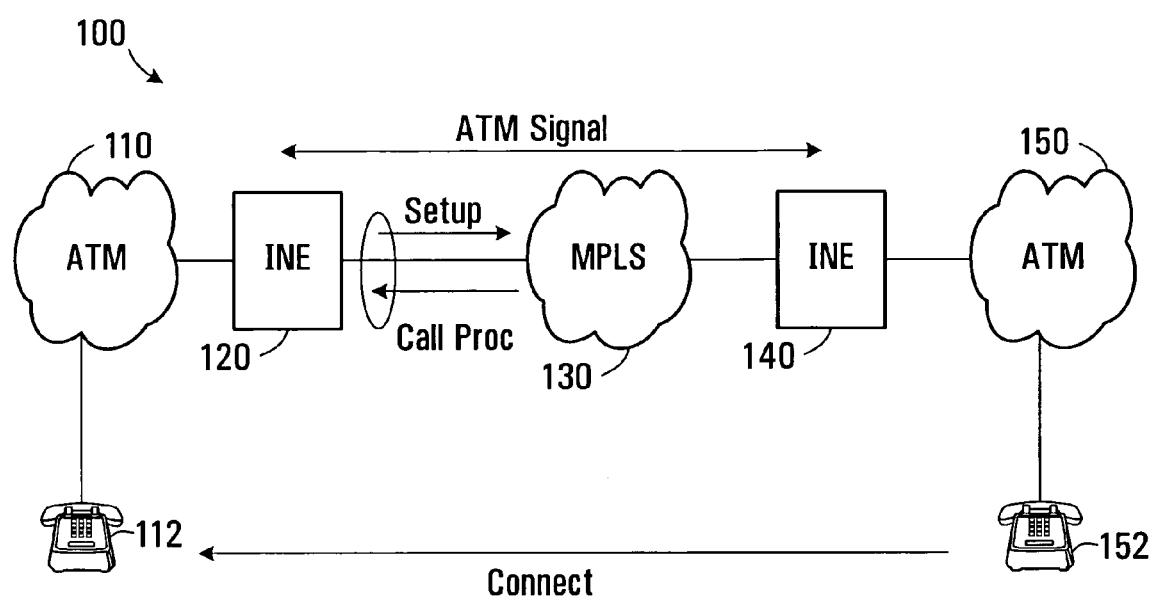
FIG. 1 is a block diagram of an example of an interworked network in which embodiments of the present invention may be implemented.

FIG. 1 is a block diagram of an example of a network 100 in which embodiments of the present invention can be implemented. The network 100 is an example of an interworked ATM-MPLS network. This scenario could arise under several conditions including a migration from ATM to MPLS networking systems for cost savings. It is to be understood, however, that the present invention can be implemented in any network where it is necessary to determine a value amongst a plurality of values for a parameter to be used between adjacent network elements in the network.

Two ATM networks 110 and 150 at each end of the network 100 are connected via a MPLS network 130. There are two multi-service interworking network elements (INE) 120 and 140 in the network 100, one at the edge of each ATM network 110 and 150, where the respective ATM network meets the MPLS network 130. Each ATM network 110 and 150 and the MPLS network 130 is comprised of a plurality of nodes (not shown). Each ATM network 110 and 150 supports at least one user device 112 and 152, respectively. Each node in the MPLS network 130 may support any combination of a plurality of encapsulation modes. Examples of encapsulation modes are 1:1 cell mode; N:1 cell mode; SDU frame mode; and PDU frame mode. Although FIG. 1 shows two ATM networks, 1 MPLS network, 2 INEs and 2 user devices, it is to be understood that any number and combination of these elements are possible and the network 100 is not limited to a ATM-MPLS interworked network.

To set up a call from the user device 112 in the ATM network 110 to the user device 152 in ATM network 150, "SETUP" and "CALL PROCEEDING" messages are exchanged between adjacent nodes in the network 100 as part of the call setup procedure. When the procedure reaches the edge of the MPLS network 130, three parameters must be negotiated between INE and a node at the edge of the MPLS network. The parameters are VPI/VCI, interworking label, and encapsulation mode. The first two are negotiated as the call setup procedure (i.e. SETUP and CALL PROCEEDING message phase) progresses from node to node using conventional methods. To enable susceptibility to clipping through the MPLS network 130, each node is conditioned or programmed to select one predetermined encapsulation mode when the node receives an indicator that susceptibility to clipping is enabled and to connect the call as the call is routed. In some embodiments, each node contains two lists of encapsulation modes, a first list containing all of the encapsulation modes supported by that node and a second list containing only the predetermined encapsulation mode. When the node receives a indicator that susceptibility to clipping is enabled for a call, the node selects the encapsulation mode from the second list, thereby only having one option. In other embodiments, the setup message contains the predetermined encapsulation mode and each node is conditioned to implement that encapsulation mode in response to receiving the setup message.

In the example described with reference to FIG. 1, a predetermined value is assigned to the encapsulation mode. It is to be understood that embodiments of the present invention can be applied to any parameter for which multiple values are possible at various network elements throughout a network.

The network in which the embodiments of the present invention can be implemented is any network of network elements, in which at least one network element supports multiple values for a parameter to be used for communications between adjacent network elements and in which the parameter must be determined before a connection between the adjacent network elements is established. The network may be, but is not limited to a packet network, an Ethernet, an IP (Internet Protocol) network or an MPLS.

Figure 2:
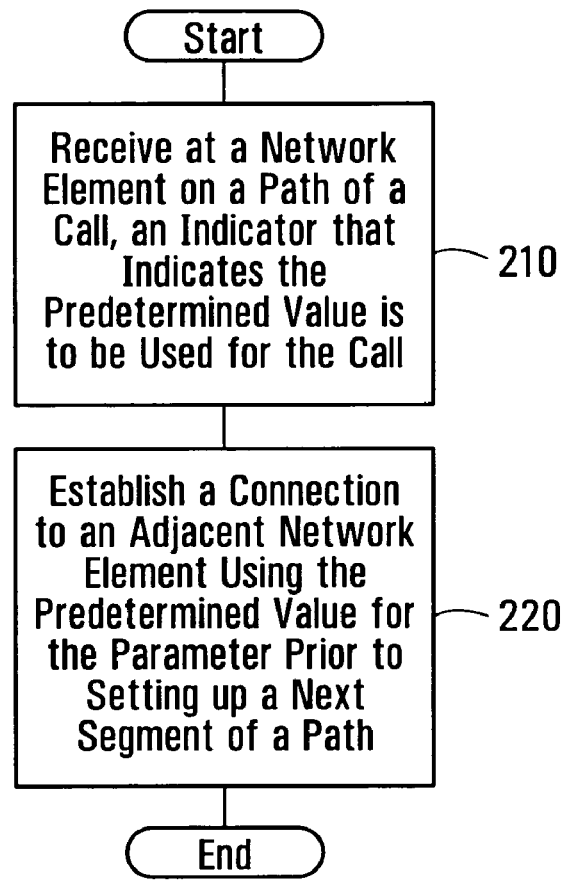
FIG. 2 is a flowchart of a method of connecting a call through a network as the call is being routed in accordance with one embodiment of the present invention.

FIG. 2 is a flowchart of a method for connecting a call across a network of network elements as a path for the call is being set up. Between adjacent network elements, an agreed valued for a parameter of the call must be used. At least one network element supports multiple values for the parameter. For example, in an MPLS network, each node has a list of encapsulation modes that it supports.

The first step of the method (Step 210) is receiving at a network element on the communication path an indicator that indicates that a predetermined value for the parameter is to be used for the call.

The next step (Step 220) is establishing a connection to an adjacent network element on the path using the predetermined value for the parameter, prior to setting up a next segment of the path. In some embodiments, the connection is established irrespective of confirmation that the adjacent network element supports the predetermined value for the parameter.

In some embodiments, the method also comprises detecting the indicator; and in response to detecting the indicator, selecting the particular value for the parameter. Examples of how the particular value is selected are selecting the particular value from a list of parameter values or selecting a special list that contains only the particular value.

In some embodiments, the method also comprises conveying the indicator to a subsequent network element. The subsequent network element is then able to repeat the method.

In some embodiments, the parameter is an encapsulation mode. In other embodiments, the parameter is a policing mode or a billing mode.

In some embodiments, the indicator comprises an indication that susceptibility to clipping is enabled for the call. The network elements are programmed to recognise the indicator and to connect the call as it is being set up, in response to receiving a signal containing the indicator.

Another embodiment of the present invention is a network element configured to implement any of the methods described above or below. Network elements include but are not limited to nodes and INEs.

Some embodiments of the present invention are implemented by a computer readable medium having computer readable instructions stored thereon that when executed implement any of the methods described herein.

Figure 3:
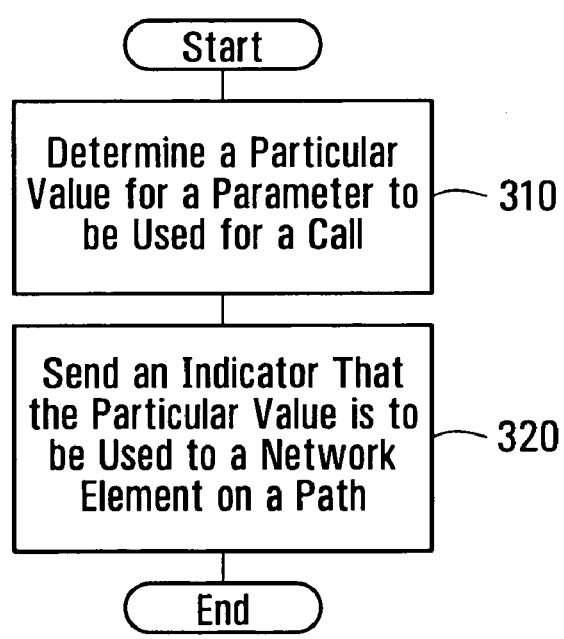
FIG. 3 is a flowchart of a method of connecting a call through a network as the call is being routed in accordance one embodiment of the present invention.

FIG. 3 is a flowchart of a method of connecting a call in a network as the call is being set up. As with the method described with reference to FIG. 2, each segment of a call within the network must be assigned a value for a parameter for which multiple values exist.

The first step (Step 310) is determining that a particular value for the parameter is to be used for all segments of the call.

The next step (Step 320) is sending an indicator to a network element on the path, the indicator indicating that the particular value is to be used, the network element being configured to use the particular value for the parameter in response receiving the indicator and to connect to an adjacent network element on the path, prior to setting up a next segment of the path. In some embodiments, the network element is configured to connect to the adjacent network element irrespective of confirmation that the adjacent network element supports the predetermined value for the parameter.

In some embodiments the method also comprises determining the particular value to be used. In some embodiments, determining the particular value comprises selecting a most efficient encapsulation mode for the call from a plurality of encapsulation modes available for the network.

In some embodiments, the method also comprises configuring the network element to use the particular value for the parameter in response to detecting the indicator.

In some embodiments, the parameter is an encapsulation mode. In some cases, the particular value for the encapsulation mode is 1:1 cell mode.

In some networks, support of the particular value is mandatory for all network elements in the network.

Figure 4:
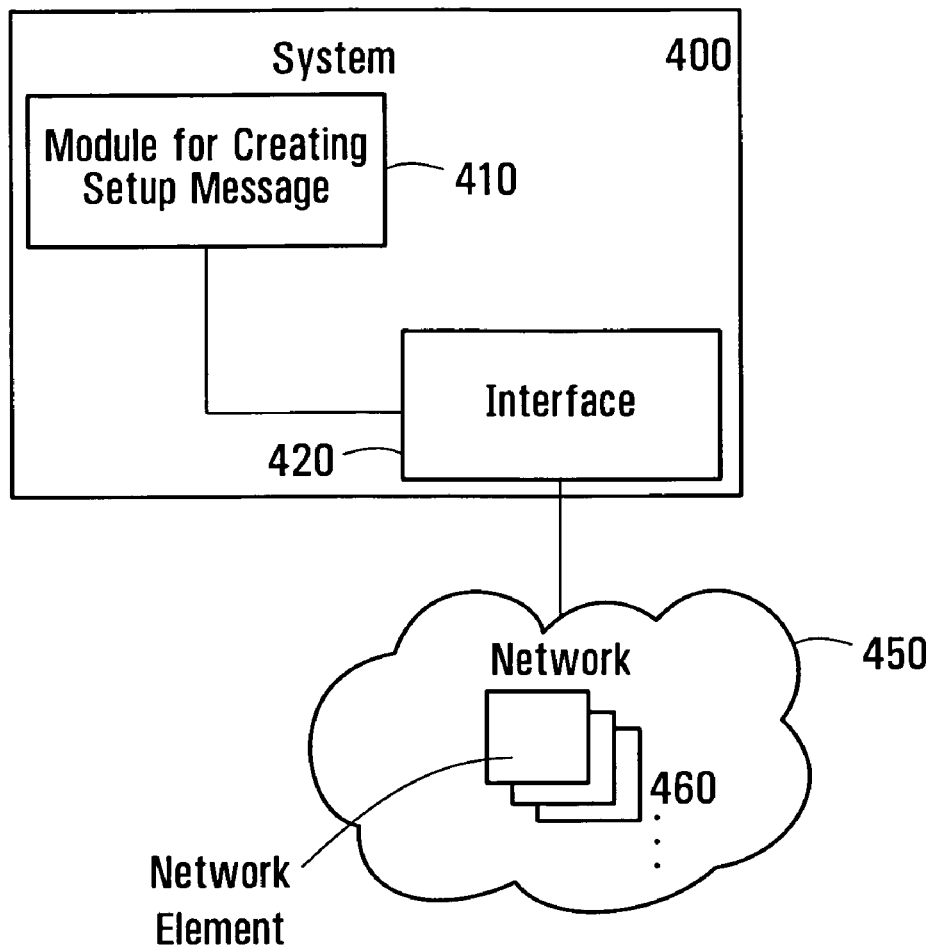
FIG. 4 is a block diagram of a system in accordance with one embodiment of the present invention.

FIG. 4 is a block diagram of a system 400 for enabling connection of a call across a network 450 of network elements 460 as a path for the call is being set up, in accordance with one embodiment of the present invention. The system comprises a module 410 for creating a setup message for the call, the setup message containing an indicator that a particular value for the parameter is to be used. The system also comprises an interface 420 for sending the setup message to a network element 460 on the path, the network element 460 being configured to use the particular value for the parameter in response to detecting the indicator and to connect to an adjacent network element upon receipt of the indicator, prior to setting up a next segment of the path.

In some embodiments, the system also comprises a module for determining the particular value to be used. The module for determining the particular value in some embodiments comprises a list of values that can be selected; means for determining a most efficient value from the list; and/or means for selecting the most efficient value. In some embodiments, the system comprises means for determining which values are supported by each network element.

In some embodiments, the system also comprises means for configuring at least one of the network elements to use the particular value for the parameter if the at least one network element detects the indicator.

The system described with reference to FIG. 4 is made of any combination of hardware and software as appropriate. The system can be located on a network manager, an INE, a node or any other network element.

Figure 5:
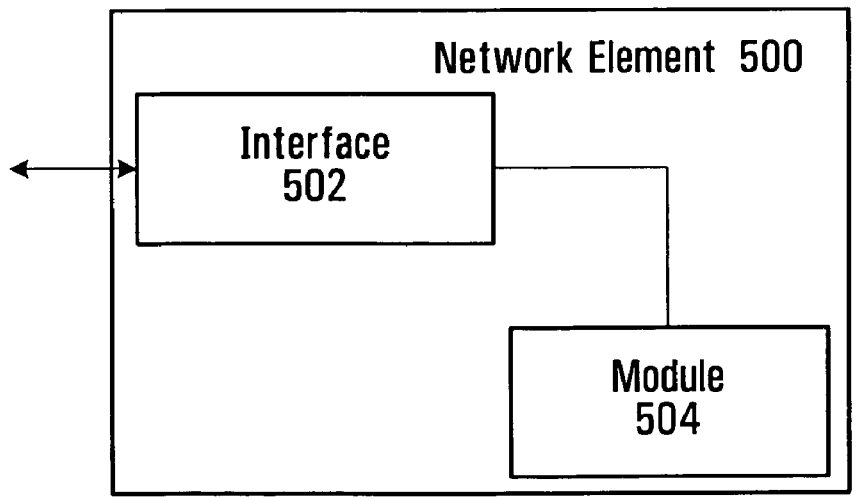
FIG. 5 is a block diagram of a network element in accordance with one embodiment of the present invention.

FIG. 5 is a block diagram of a network element 500 configured to in accordance with an embodiment of the present invention. The network element 500 is comprised of an interface 502 and a module 504. The interface 502 receives an indicator that a predetermined value is to be used for a parameter of a call. In some embodiments, the interface 502 is a port on a node. The module 504 is for connecting the call as the call is being routed using the predetermined value for the parameter. In some embodiments, the module 504, establishes a cross-connect within a node using a specified encapsulation mode as the call is being routed. In some embodiments, the module connects the call irrespective of having confirmation that subsequent network elements on the path of the call support the predetermined value for the parameter.

What has been described is merely illustrative of the application of the principles of the invention. Other arrangements and methods can be implemented by those skilled in the art without departing from the spirit and scope of the present invention.

The invention claimed is:

1. A method for connecting a call across an Asynchronous Transfer Mode-Multiprotocol Label Switching (ATM-MPLS) network of network elements as a communication path for the call is being set up, the call comprising an encapsulation mode parameter for which a particular value must be assigned for each MPLS segment of the communication path between adjacent network elements, at least one network element supporting multiple values for the encapsulation mode parameter, the method comprising:

receiving at a network element on the communication path an indicator that network elements along the communication path of the call are required to use a predetermined value for the encapsulation mode parameter when susceptibility to clipping is enabled for the call; and establishing a connection to an adjacent network element on the communication path using the predetermined value for the encapsulation mode parameter, prior to setting up a next MPLS segment of the communication path.

2. The method of claim 1, wherein establishing a connection is performed irrespective of confirmation that the adjacent network element supports the predetermined value for the parameter.

3. The method of claim 1, further comprising:
detecting the indicator; and
in response to detecting the indicator, selecting the particular value for the parameter.

4. The method of claim 1, further comprising:
conveying the indicator to a subsequent network element.

5. A network element configured to implement the method of claim 1.

6. A computer readable medium having computer readable instructions stored thereon that when executed implement the method of claim 1.

7. A method for connecting a call across an Asynchronous Transfer Mode-Multiprotocol Label Switching (ATM-MPLS) network of network elements as a path for the call is being set up, the call comprising an encapsulation mode parameter for which a value must be assigned for each MPLS segment of the path between adjacent network elements, at least one network element supporting multiple values for the encapsulation mode parameter, the method comprising:
determining that a particular value for the encapsulation mode parameter is to be used for the call; and
sending an indicator to a network element on the path, the indicator indicating that the particular value is to be used when susceptibility to clipping is enabled for the call, the network element configured to use the particular value for the encapsulation mode parameter in response receiving the indicator and to connect to an adjacent network element on the path, prior to setting up a next MPLS segment of the path.

8. The method of claim 7, further comprising:
determining the particular value to be used.

9. The method of claim 8, further comprising:
selecting a most efficient encapsulation mode for the call from a plurality of encapsulation modes available for the ATM-MPLS network.

10. The method of claim 7, further comprising:
configuring the network element to use the particular value for the encapsulation mode parameter in response to detecting the indicator.

11. The method of claim 7, further comprising:
selecting the particular value for the encapsulation mode from the group consisting of: 1:1 cell mode; N:1 cell mode; SDU frame mode; and PDU frame mode.

12. The method of claim 7, wherein support of the particular value is mandatory for all of the network elements in the ATM-MPLS network.

13. A computer readable medium having computer readable instructions stored thereon that when executed implement the method of claim 7.

14. A system for enabling connection of a call across an Asynchronous Transfer Mode-Multiprotocol Label Switching (ATM-MPLS) network of network elements as a path for the call is being set up, the call comprising an encapsulation mode parameter for which a value must be assigned for each MPLS segment of the path between adjacent network elements, at least one network element supporting multiple values for the encapsulation mode parameter, the system comprising:
a module for creating a setup message for the call, the setup message containing a indicator that a particular value for the encapsulation mode parameter is to be used when susceptibility to clipping is enabled for the call; and
an interface for sending the setup message to a network element on the path, the network element configured to use the particular value for the encapsulation mode parameter in response to detecting the indicator and to connect to an adjacent network element, prior to setting up a next MPLS segment of the path.

15. The system of claim 14, further comprising:
a module for determining the particular value to be used.

16. The system of claim 15, wherein the module for determining the particular value comprises:
a list of values that can be selected;
means for determining a most efficient value from the list; and
means for selecting the most efficient value.

17. The system of claim 14, further comprising:
means for configuring at least one of the network elements to use the particular value if the at least one network element detects the indicator.

* * * * *

UNITED STATES PATENT AND TRADEMARK OFFICE
CERTIFICATE OF CORRECTION

PATENT NO. : 7,660,311 B2
APPLICATION NO. : 11/324612
DATED : February 9, 2010
INVENTOR(S) : Sorrini et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 842 days.

Signed and Sealed this

Twenty-eighth Day of December, 2010

David J. Kappos
*Director of the United States Patent and Trademark Office*